United States Patent [19]
Davidson, Jr. et al.

[11] Patent Number: 5,636,333
[45] Date of Patent: Jun. 3, 1997

[54] MULTI-PROTOCOL NETWORK INTERFACE

[75] Inventors: Peter S. Davidson, Jr.; David P. Schramm; David H. Whitehead, all of Lexington; Paul J. Wingert, Nicholasville, all of Ky.

[73] Assignee: Lexmark International, Inc., Lexington, Ky.

[21] Appl. No.: 646,649

[22] Filed: May 3, 1996

Related U.S. Application Data

[63] Continuation of Ser. No. 359,500, Dec. 20, 1994, abandoned.

[51] Int. Cl.$^6$ ................................................ G06K 15/00
[52] U.S. Cl. .................................. 395/114; 395/113
[58] Field of Search .......................... 395/112, 113, 395/114, 115, 116, 101, 117, 109, 164, 500, 732, 733–742, 860, 864, 868; 358/401, 468, 403, 444, 452, 404, 437, 402, 407, 442, 408; 347/142, 19; 355/202–209; 370/85.6

[56] References Cited

U.S. PATENT DOCUMENTS

| | | | |
|---|---|---|---|
| 5,075,875 | 12/1991 | Love et al. | 395/117 |
| 5,084,875 | 1/1992 | Weinberger et al. | 371/29.1 |
| 5,164,842 | 11/1992 | Gauronski et al. | 358/401 |
| 5,214,772 | 5/1993 | Weinberger et al. | 395/575 |
| 5,220,566 | 6/1993 | Ikenoue | 370/112 |
| 5,220,674 | 6/1993 | Morgan et al. | 395/800 |
| 5,226,112 | 7/1993 | Mensing et al. | 395/114 |
| 5,247,623 | 9/1993 | Sun | 395/325 |
| 5,271,065 | 12/1993 | Rourke et al. | 358/450 |
| 5,303,336 | 4/1994 | Kageyama et al. | 395/114 |
| 5,323,393 | 6/1994 | Barrett et al. | 370/85.8 |
| 5,333,286 | 7/1994 | Weinberger et al. | 395/575 |
| 5,353,388 | 10/1994 | Motoyama | 395/117 |
| 5,361,265 | 11/1994 | Weinberger et al. | 371/29.1 |
| 5,371,837 | 12/1994 | Kimber et al. | 395/114 |
| 5,438,528 | 8/1995 | Emerson et al. | 364/580 |

FOREIGN PATENT DOCUMENTS 0 575 168 A1  12/1993  European Pat. Off. .......... G06F 3/12

OTHER PUBLICATIONS

HP JetDirect Network Interface Configuration Guide, Hewlett–Packard Manual Part No. J2371–90001, 1993, pp. iv–ix and Section 2 Software Installation and Configuration for Novell Netware Networks, pp. 2–2 through 2–18.

HP JetDirect EX External Network Interface Configuration Guide, Hewlett–Packard Manual Part No. J2382–90101, 1993, pp. 7–12 and Section 2 Novell NetWare Networks, pp. 2–2 through 2–36.

(List continued on next page.)

*Primary Examiner*—Edward L. Coles, Sr.
*Assistant Examiner*—Dov Popovici
*Attorney, Agent, or Firm*—John J. McArdie, Jr.; Ronald K. Aust

[57] ABSTRACT

Multiple host computers utilizing multiple network protocols on a network are connected through an interface, or network adapter, to a printer having a printer controller capable of bi-directional communication with the computers on the network. The interface processes print job information and priority information for the printer separately for each network protocol supported. There is a common interface to the network and a common interface to the printer in the network adapter, but each supported protocol processes priority and print job information in a particular protocol separately. Each protocol processing section separately processes the priority information, and the interface to the printer communicates this priority information to the printer in preference to communicating print job information. In this way, no matter which protocol has priority information to be communicated to the printer, and whether this protocol or another protocol is currently sending print job information to the printer, any protocol can communicate priority information to the printer and receive a priority reply.

19 Claims, 5 Drawing Sheets

OTHER PUBLICATIONS

Lexmark WinWriter 600 User's Reference, Manual No. SA40-0779-00, 1993, Chapter 2 Using the Windows Printing System, pp. 11-26 and Chapter 3 Checking Pring Status, pp. 27-39.

Standard Signaling Method for a Bi-directional Parallel Peripheral Interface for Personal Computers, IEEE P 1284 D2.00, Sep. 10, 1993, Institute of Electrical and Electronic Engineers, pp. 1-119.

Network Printing Alliance Protocol, A Printer/Host Control Specification, Level 1, Revision N, Feb. 11, 1994, Developed By The Network Printing Alliance.

MULTI-PROTOCOL NETWORK INTERFACE

This application is a continuation of application Ser. No. 08/359,500, filed on Dec. 20, 1994, now abandoned.

BACKGROUND OF THE INVENTION

This invention relates to interfaces between multi-protocol network host computers and printers on the network. The invention is disclosed particularly in relation to a network adapter circuit having a first physical connection to the multi-protocol computer network, a second physical connection to a printer controller, and an intermediate portion for separately processing print job information and priority information presented in each different network protocol.

In accordance with the embodiment of the invention to be described, a network adapter interfaces between a network of host computers and a printer to communicate priority information in accordance with the Network Printer Alliance Protocol. The published Network Printer Alliance Protocol (NPAP) defines a bi-directional means for communication between a host computer and a printer. The NPAP compliant data and commands are transported under the various network protocols such as TCP/IP.

The details of the NPAP am contained in the NPAP Specification Level 1, Revision N, Feb. 1, 1994. This NPAP Specification is incorporated herein by reference. Copies of the specification are, for example, presently available via anonymous FTP from ftp.lexmark.com [192.146.101.4]. The employment of the NPAP means of communication is described in a number of examples for a single protocol network adapter interface in a commonly assigned U.S. patent application Ser. No. 08/350,860, now U.S. Pat. No. 5,550,957, entitled MULTIPLE VIRTUAL PRINTER NETWORK INTERFACE, filed Dec. 7, 1994, which is also incorporated herein by reference.

In the embodiment to be described hereinafter, the network adapter supports four network protocols: LexLink, Novell NetWare, Apple Talk and TCP/IP. The adapter may receive data from each of these protocols simultaneously, but only one of the protocols may have access to the printer at any one time. This access is called capturing the printer. When one protocol captures the printer (for a print job) the others are buffered until they get their turn. This poses a problem for the timely processing of priority inquiries utilizing NPAP. If these priority requests are processed in the same fashion as print data, the response from the printer may be delayed significantly.

In accordance with one aspect of the invention, the solution to this problem entails having an alternate channel through the network adapter and in the printer that will allow N PAP queries to bypass the print job information. The alternate channel must function so that NPAP priority information can bypass print data whether the print data is from that network protocol or another network protocol so that the priority information can be processed immediately. In practice, an alternate channel of communication is provided through each module of network protocol code employed by the network adapter.

DETAILED DESCRIPTION

In the above-identified co-pending commonly assigned patent application, there is a description of the operation of a network adapter utilizing a single network protocol (Novell NetWare) and describing the operation of a network adapter, or interface, which includes a microprocessor and an application specific integrated circuit (ASIC) for assisting in data transfer. In that description, the operation of the transfer of data from the network adapter to the network and from the network adapter to an attached printer is described in terms of a single software structure for the illustrative single protocol, in that case Novell NetWare. In the present interface arrangement, the network adapter performs the same functions at the interfaces by employing Media Access Control (MAC) code and Printer Device code, each module interfacing with all of the Protocol modules of code. The present network adapter supports an exemplary four network protocols by including a Protocol module of code for each network protocol.

Figure 1:
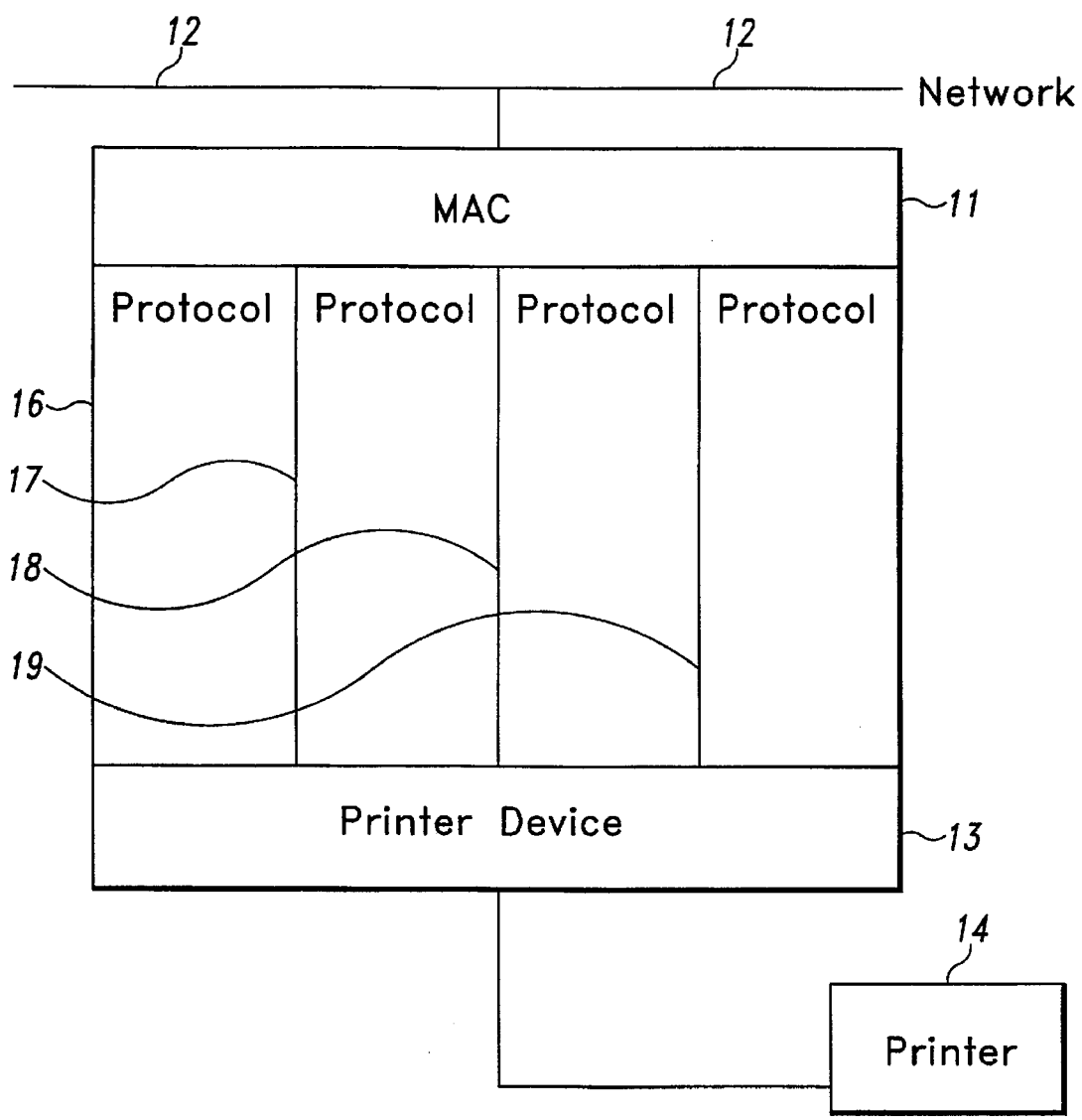
FIG. 1 is a functional diagram of the software of a network adapter in accordance with the present invention.

With reference to FIG. 1, the code executed by the network adapter microprocessor is organized with a MAC portion 11 interfacing with the network 12, and with a Printer Device portion 13 interfacing with the controller of the printer 14. The MAC code 11 receives data from the multi-protocol network and routes it to the proper Protocol. The Printer Device code 13 is "captured" by a Protocol and takes data from the Protocol and sends it to the printer 14. In the illustrated network adapter, the Protocol 16 is for LexLink, the Protocol 17 is for Novell NetWare, the Protocol 18 is for Apple Talk and the Protocol 19 is for TCP/IP.

The network adapter can receive data in each of these network protocols simultaneously, but only one of the Protocol modules may have access to the printer at any one time. This access is called capturing the printer. When one Protocol captures the printer (for a print job), the data routed to other Protocols is buffered until that Protocol can capture the printer. This poses a problem for the timely processing of priority information such as exchanges of printer status information, since a priority printer status query may be received in one Protocol while another Protocol has captured the printer for a print job. If the print job is allowed to complete before the priority information is passed to the printer, then a response from the printer will be significantly delayed.

In accordance with the present invention, an alternate channel of communication through each Protocol is provided so that priority information can bypass print data from its own and other Protocols and be processed immediately. As described in the above-mentioned co-pending commonly assigned patent application, the communication with the printer, and with appropriate hosts on the network, is in the present instance established by the use of commands and data conforming to the NPAP specification. The NPAP is used herein to provide a means for returning printer status information to a host computer from a printer and for sending queries from a host computer to a printer for status information. Such priority information and queries conforming to the NPAP, as well as print job information contained in NPAP "wrappers", are communicated through the network adapter.

In the above-identified co-pending patent application, such priority printer status messages and inquiries are handled in a single network protocol network adapter separately from the processing of print job data. This permits asynchronous communication between the printer and each host utilizing the printer regardless of a "busy" condition at the printer while the printer is receiving print jobs. In the system to be described hereinafter, a multiple protocol network adapter permits asynchronous communication of priority information between the NPAP-compliant printer and each NPAP-compliant host in a multiple protocol network environment.

In order to implement the provision of an alternate communication channel to the printer in the network adapter, each Protocol is provided with an alternate path through itself from the MAC to the Printer Device, and the Printer Device has an alternate path to the printer.

To create the alternate channel to communicate priority information between the printer 14 and the Printer Device code 13, multiple modes of communication over the connection between the printer and the network adapter are used. These modes include data mode for normal print jobs, NPAP status mode for NPAP queries and responses, and Device Status Alert (DSA) mode for asynchronous device status alerts from the printer. The details of communication between Printer Device 13 and the printer 14 are as described in the above-identified co-pending patent application, except that in the present multi-protocol situation, the Printer Device code performs the communication functions for all of the Protocols rather than a single Protocol.

With further reference to FIG. 1, when a Protocol such as the Protocol 16 for LexLink has a print job, it captures the Printer Device 13 and sends it the print job. The Printer Device sends the print job data to the printer in data mode. If an NPAP query comes in to this Protocol (or another Protocol), that Protocol sends the query to the Printer Device 13 in a different way, or on an "alternate channel". This causes the Printer Device 13 to interrupt data mode communication with the printer 14 and enter NPAP status mode. When in this mode, the Printer Device 13 sends the NPAP query to the printer and waits for the response. It then sends the response back to the Protocol, such as 16, which sent the query and returns to data mode communication with the printer 14 to continue the print job.

When the printer 14 has an event occur calling for a priority alert communication to host computers on the network, it sends a Device Status Alert (DSA) to the adapter. The printer interrupts data mode, if necessary, to enter DSA mode, and in this mode the printer 14 sends the DSA to Printer Device 13 and then returns to data mode. Printer Device 13 then sends the DSA to each Protocol module on the alternate channel for that Protocol.

LexLink is a print protocol based on the IEEE 802.2 standard. The LexLink protocol is used to implement printing in the Windows NT Advanced Server, OS/2 Lan Manager and OS/2 Lan Server network operating system environments. When NPAP data is delivered to and from the network adapter in the LexLink protocol, it is encapsulated within a LexLink packet, which consists of a header and data. The details of the LexLink protocol are not pertinent to the present invention and will not be described herein.

In practice, bit seven of the second byte of a LexLink header is set (="1") to indicate an NPAP packet, and bit six of the second byte of the LexLink header is set to designate "alternate channel", or priority, NPAP data. For the LexLink protocol, a network packet is addressed as being for the alternate channel by setting the alternate channel bit in the LexLink header. Whenever a packet is received by the Protocol module 16 for LexLink with this bit set, the packet is immediately sent to the Printer Device 13 on the alternate channel. When the Printer Device 13 sends the LexLink Protocol module a packet on the alternate channel (an NPAP query response or a DSA), the LexLink Protocol module sets the alternate channel bit in the LexLink header of the packet and sends it to the host through the MAC 11.

Figure 2:
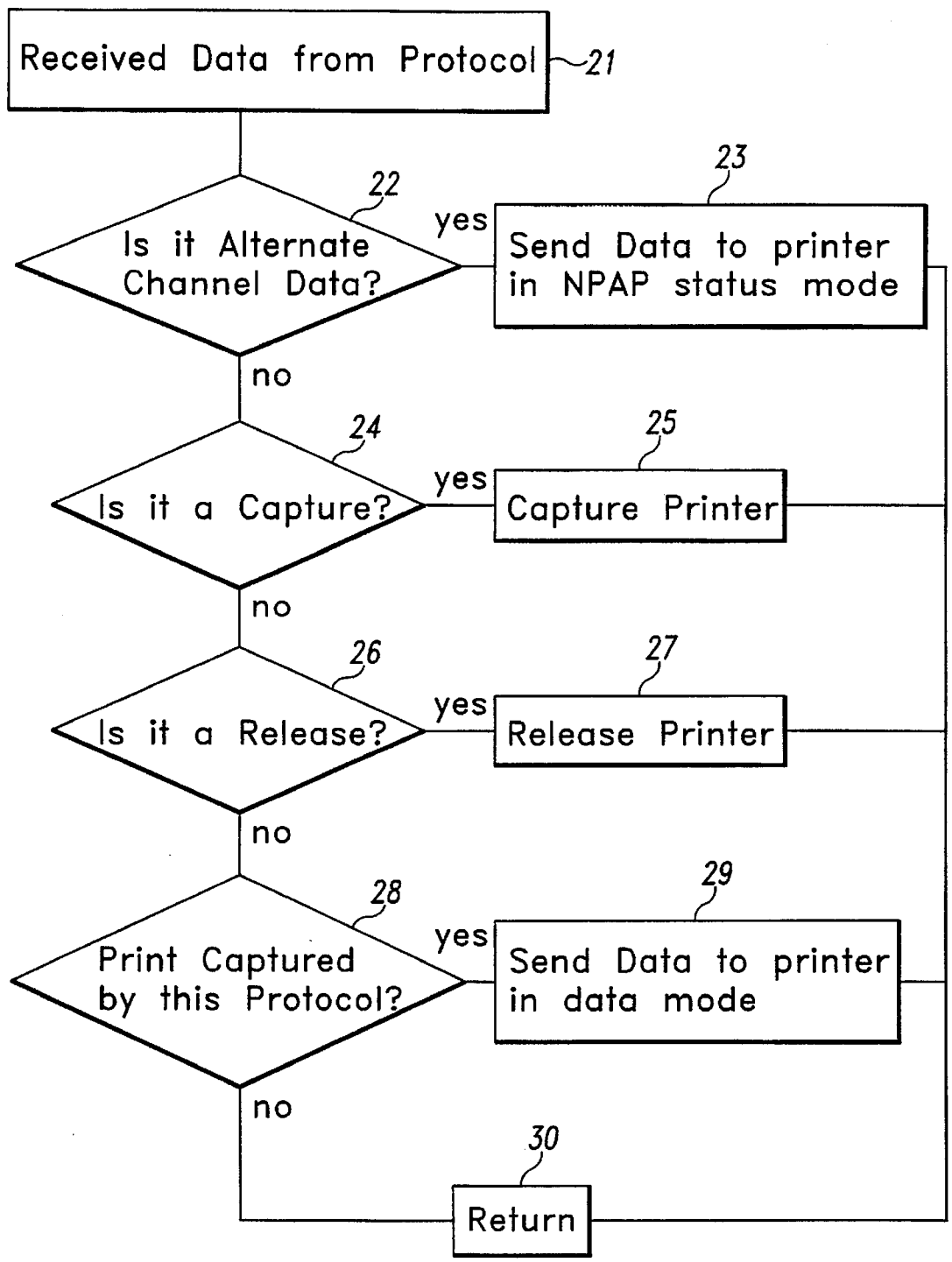
FIG. 2 is a flowchart of the operation of the Printer Device software of FIG. 1 for sending data from a Protocol module of code to a printer.

With reference now to FIG. 2, the operation of the Printer Device 13 code in receiving data from a Protocol module 16–19 is described. The Printer Device receives data (21) from one of the Protocols and determines if it is alternate channel data (22). If it is alternate channel data to be communicated immediately to the printer, Printer Device sends the data (23) to the printer in NPAP status mode and returns (30). If the data is not alternate channel data, the Printer Device determines if it is a capture of the printer (24).

If this data is a capture of the printer, the Printer Device captures the printer (25)and returns (30). If the data is not a capture of the printer, it is determined if this is a release (26) of the printer; and if it is a release of the printer, the printer is released (27) and the Printer Device returns (30). This would indicate the completion of a print job.

If the data is not a release of the printer, the Printer Device determines if the printer 14 is currently captured by the sending Protocol (28). If so, the data is sent to the printer in data mode (29) and the Printer Device returns (30). If the printer 14 is not currently captured by the Protocol sending the data, Printer Device merely returns (30).

Figure 3:
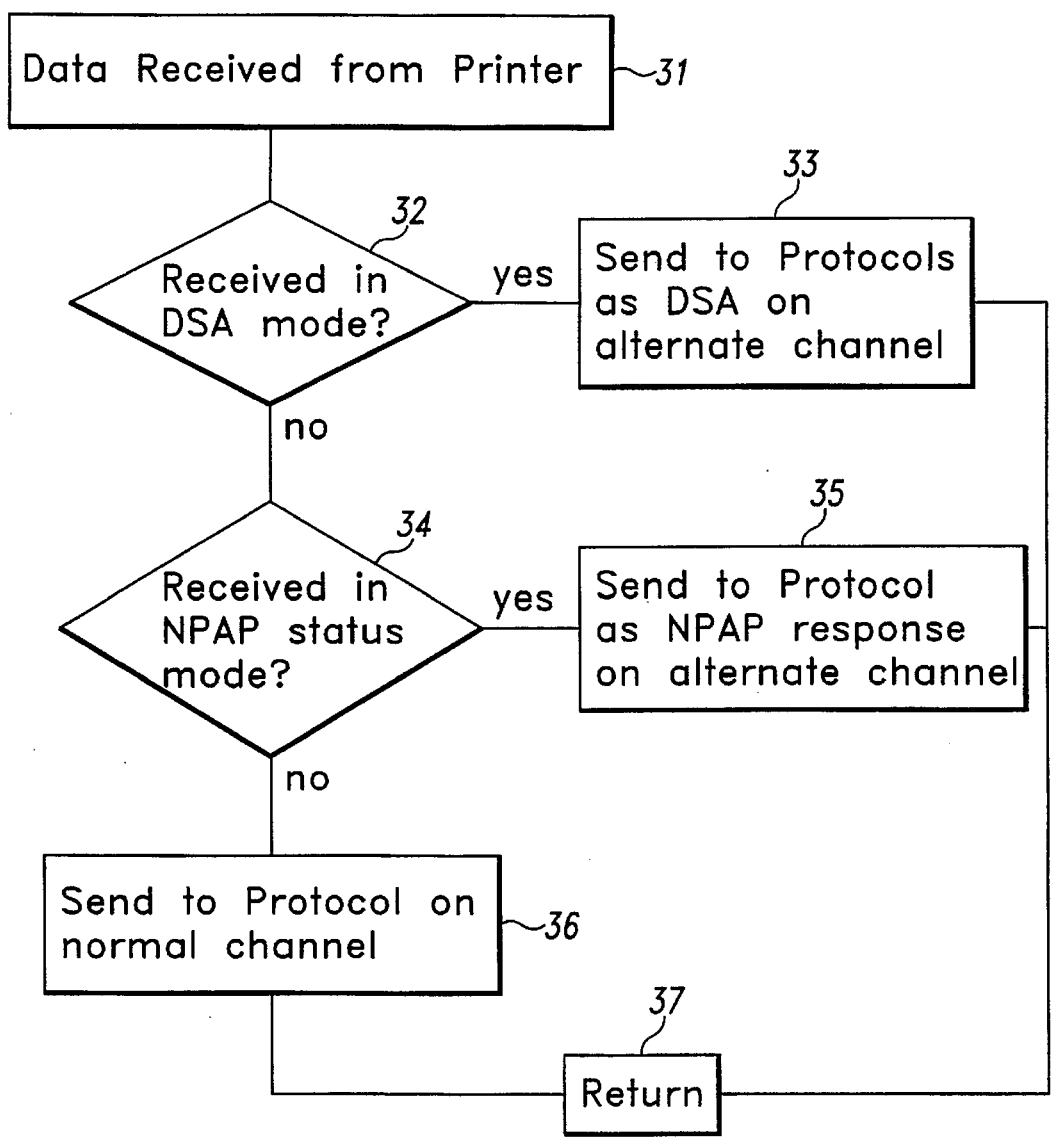
FIG. 3 is a flowchart of the operation of the Printer Device software of FIG. 1 for sending data from the printer to a Protocol module of code.

Turning now to FIG. 3, the operation of the Printer Device code for receiving data from the printer 14 is described. Printer Device receives data from the printer (31) and determines if the data is received in DSA mode (32). If so, the Printer Device sends the device status alert to each protocol on the alternate channel for that protocol (33) and returns (37). If the data was not received in DSA mode, Printer Device determines if the data was received in NPAP status mode (34). If so, the data is sent to the Protocol which was the source of the status request as an NPAP response on the alternate channel for that Protocol (35), and Printer Device returns (37).

If the data was not received in NPAP status mode, the Printer Device sends the data to the Protocol currently capturing the printer on the normal channel (36). The Printer Device then returns (37).

Figure 4:
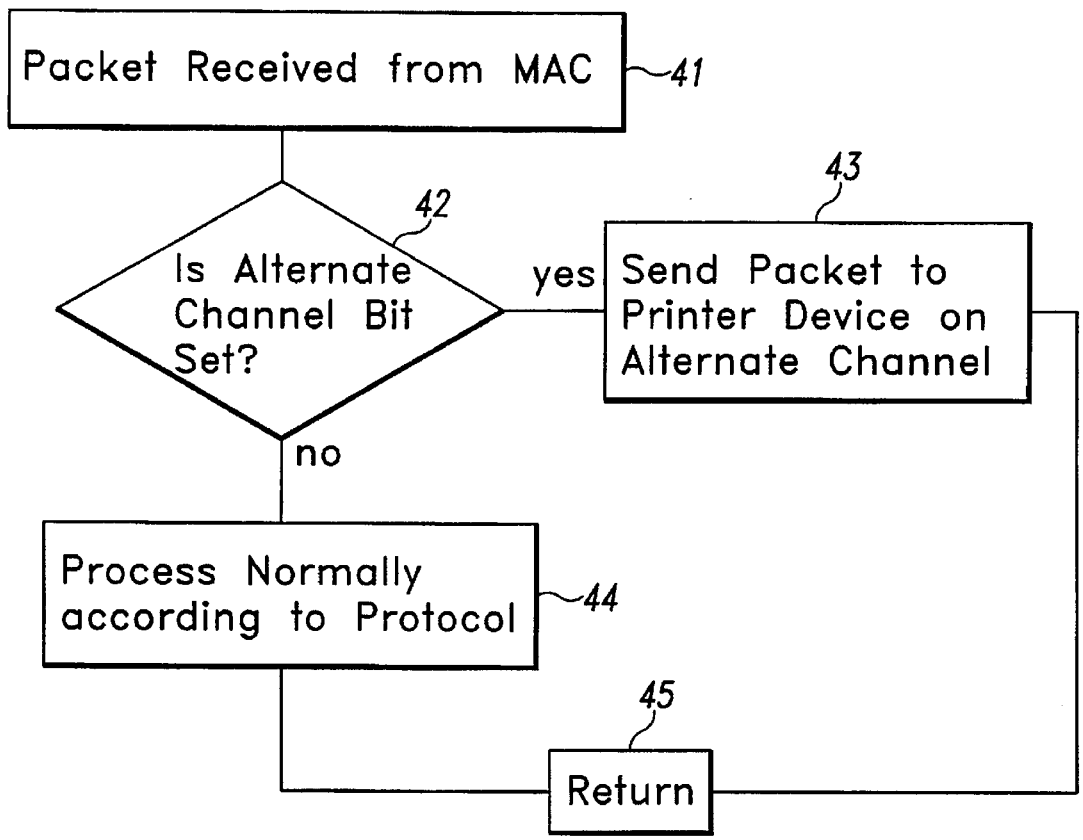
FIG. 4 is a flowchart of the relevant function of an illustrative Protocol of FIG. 1 for sending data from the Media Access Control code to the Printer Device code.

With reference now to FIG. 4, handling of data by an exemplary Protocol module, in this case the LexLink Protocol module, as that data is received from the MAC is described. After a packet is received from the MAC (41), the LexLink Protocol determines if the alternate channel bit is set in that packet (42). If so, the packet is sent to Printer Device on the alternate channel (43), and the Protocol returns (45). If the alternate channel bit is not set, the LexLink Protocol processes the data normally to send print job data to the Printer Device (44). The LexLink Protocol then returns (45).

Figure 5:
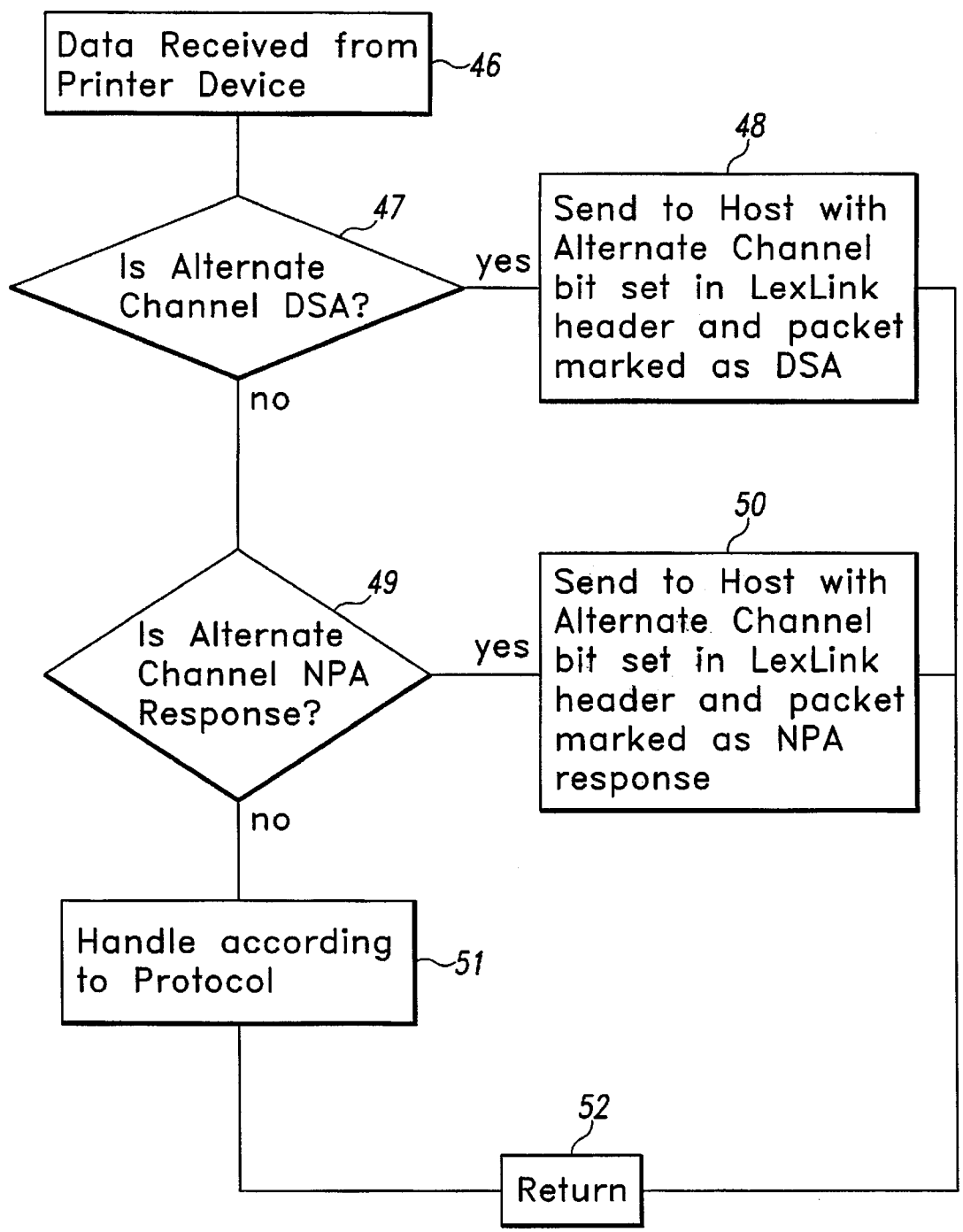
FIG. 5 is a flowchart of the operation of the exemplary Protocol of FIG. 4 for sending data from the Printer Device code to the Media Access Control code.

In FIG. 5, the operation of the LexLink Protocol module in handling data received from the printer is described. After data is received from the Printer Device (46), the LexLink Protocol determines if it is an alternate channel DSA (47). If so, the protocol sends the DSA to one or more host computers through the MAC with the alternate channel bit set in the LexLink header and with the packet marked as a DSA (48). The Protocol then returns (52). If the data is not an alternate channel DSA, the LexLink Protocol then determines if the data is an alternate channel NPAP response (49). If so, the Protocol sends the data to the requesting host through the MAC with the alternate channel bit set in the LexLink header and with the packet marked as an NPAP response (50). The Protocol then returns (52). If the data is not an alternate channel NPAP response, the LexLink Protocol handles the data, such as to send a non-NPAP communication to a host (51). The protocol then returns (52).

With regard to the NetWare Protocol 17, after a packet is received from the MAC 11, the Protocol 17 inspects the Internetwork Packet Exchange (IPX) header. The Source Socket value in the IPX Source Address field uniquely identifies the type of data contained in the packet. Therefore, the Protocol 17 does not need to inspect the NPAP data section of the packet. If the Source Socket specifies an NPAP command, the Protocol 17 sends the data to the NPAP command processor, or alternate channel, of the printer port and returns. If the Socket specifies print data, the Protocol 17 sends the data to the print processor, or regular channel, of the printer port and returns.

The Protocol 17 handles both Device Status Alerts (DSAs) and NPAP command replies with a single sending process. After data is received from the Printer Device, it is encapsulated in an IPX datagram and sent to one or more workstations. The Destination Socket field of the IPX Destination Address field is used to differentiate between DSA and NPAP command replies. The value used for the Destination Socket in the reply is defined by the user when the NPAP command is issued. Note that the user registers for DSA's via an NPAP command. Therefore, DSA's are received by the user on Socket "X", and NPAP replies are received by the user on Socket "Y". Values for X and Y are user defined but must not be equal. After sending the DSA or NPAP reply, the sending process returns.

With regard to the operation of the Apple Talk Protocol 18, to handle NPAP priority information within the Apple Talk Protocol, an NPAP listening and responding entity, separate from the printing entity, is created through the Apple Name Binding Protocol (NBP). In effect, the MAC code 11 communicates with different entities within the Apple Talk Protocol 18 for NPAP priority information and for print job information.

A unique address within the Apple Talk Protocol 18 is provided to communicate with hosts on the network wishing to use the "alternate channel". The entity in the Apple Talk Protocol is referred to as "NPA Responder". NPA Responder replies to all NBP-compliant queries that use the Apple Talk type field "NPA Responded". Print job information would normally be communicated to a second, separate, entity within the Apple Talk Protocol 18.

All priority NPAP requests and responses are communicated in packets using the Apple Talk Transport Protocol (ATP). ATP provides loss-free delivery of packets from a source to a destination. ATP packets include a header that has a four-byte user-definable area and a 0 to 578 byte data block. The priority NPAP requests and responses are differentiated from one another through the use of the four "user bytes". Since the NPA Responder entity in the Apple Talk Protocol 18 is separate from the Apple Talk Protocol printing entity, there is no need to parse incoming packets to separate priority NPAP packets from print data packets within the Protocol.

Considering the ATP packet header in more detail, byte zero in the user-byte area is a command byte, in which bit seven is a reply indicator. If the bit seven is a "one", this indicates that the message is a command reply, and if the bit seven is a zero, this indicates that the message is a command or an Alert. The remaining bits of the command byte are used to indicate a command type. A hexadecimal one indicates an NPAP request, and a hexadecimal two indicates a Device Status Alert. In the present form of the Protocol, byte one of the user-byte area is unused, and bytes two and three are used for sequence numbers for multiple packet responses. The NPAP packet data is contained in the 0 to 578 byte data block.

The TCP/IP Protocol 19 uses a UDP port (9300) for its alternate channel. When the Protocol 19 receives an NPAP request through the MAC, the source IP address and source UDP port of the request is saved. The NPAP reply from the Printer 14 through Printer Device 13 is sent to this saved address and saved UDP port. Packets received by the Protocol 19 on UDP port 9300 are screened to ensure that they are NPAP packets and then sent through the Printer Device to the printer's alternate channel.

The Protocol 19 prepends a header to an NPAP response or NPAP Device Status Alert (DSA) which includes an acknowledgement number and sequence numbering information (if the NPAP response had to be fragmented when sent over the network). The host acknowledges a DSA by sending the DSA's acknowledgement number to the Protocol's UDP port 9301. If an acknowledgement is not received, the Protocol will retransmit the DSA up to six times at 10 second intervals until acknowledged.

What is claimed is:

1. A method for communicating priority information in a multi-protocol network of host computers and a printer controller for a printer, said method comprising the steps of:

receiving, from a multi-protocol computer network, print job information and priority information in a plurality of network protocols;

providing a plurality of network protocol processing circuits each for processing print job information and priority information received in accordance with a network protocol in the plurality of network protocols different from other network protocols in the plurality of network protocols, each network protocol processing circuit processing priority information separately from print job information; and communicating with a printer to communicate priority information from any network protocol processing circuit with the printer regardless of the status of communication of print job information to the printer from any network protocol processing circuit of the plurality of network protocol processing circuits.

2. The method of claim 1 in which a network protocol processing circuit of the plurality of network protocol processing circuits receives print job information having a header containing a first address and receives priority information having a header containing a second address and processes the print job information in accordance with the first address in its associated header and processes the priority information in accordance with the second address in its associated header.

3. The method of claim 1 in which the print job information in a first network protocol includes a first type of header and the priority information in the first network protocol includes a second type of header, the plurality of network protocol processing circuits including a first network protocol processing circuit for processing the first network protocol and distinguishing the print job information with the first header from the priority information with the second header.

4. A method for communicating priority information in a multi-protocol network of host computers and a printer controller for a printer, said method comprising the steps of:

receiving print job information and priority information in each of a plurality of network protocols from a multi-protocol computer network;

providing a plurality of network protocol processing circuits each for processing print job information and priority information received in accordance with a network protocol different from other network protocols in the plurality of network protocols; and permitting the priority information in any of said plurality of network protocols to bypass the print job information in any of said plurality of network protocols so that the priority information may be exchanged between said host computers and said printer without said printer having to first complete a pending print job.

5. A method for communicating priority information in a multi-protocol network of host computers and a printer controller for a printer, said method comprising the steps of:

receiving, from a multi-protocol computer network, print job information and priority information in the same network protocol;

providing a plurality of network protocol processing circuits, one of said network protocol processing circuits processing print job information and priority information received in accordance with said same network protocol of the plurality of network protocols, each network protocol processing circuit processing priority information separately from print job information; and communicating with a printer to communicate priority information from said network protocol processing circuit to the printer regardless of the status of communication of print job information to the printer from any network protocol processing circuit of the plurality of network protocol processing circuits.

6. An interface used in a printing system including a multi-protocol network of host computers and a printer, said interface comprising:

(a) a receiver circuit that is in communication with said multi-protocol network of host computers, said network of host computers being configured to transmit both print job information and priority information in a plurality of network protocols, said receiver circuit being configured to receive said print job information in any of said plurality of network protocols and said priority information in any of said plurality of network protocols;

(b) a plurality of network protocol processing circuits, comprising at least one network protocol processing circuit configured to process said print job information associated with one of said plurality of network protocols on a first channel, and at least one network protocol processing circuit configured to process priority information associated with one of said plurality of network protocols on a second, alternate channel; said priority information being processed substantially simultaneously via said second, alternate channel while said print job information is being processed via said first channel, said priority information thereby bypassing the print job information without said printer having to first complete a pending print job; and (c) a transmitter circuit that is in communication with a printer and with said plurality of network protocol processing circuits, said transmitter circuit being configured to transmit to said printer both (i) said print job information associated with one of said plurality of network protocols, and (ii) said priority information associated with one of said plurality of network protocols, said priority information being transmitted substantially in real time to said printer regardless of the status of any portion of said print job information.

7. The interface as recited in claim 6 wherein said transmitter circuit is configured to transmit substantially immediately said priority information associated with one of said plurality of network protocols in the form of a message that is interspersed between packets of said print job information associated with one of said plurality of network protocols, even though a portion of said print job information may remain to be transmitted to said printer.

8. An interface used in a printing system including a multi-protocol network of host computers and a printer, said interface comprising:

(a) a receiver circuit that is in communication with said multi-protocol network of host computers, said network of host computers being configured to transmit both print job information and priority information in a plurality of network protocols, said receiver circuit being configured to receive both said print job information and said priority information in a plurality of network protocols;

(b) a plurality of network protocol processing circuits, each said network protocol processing circuit being configured to process (i) said print job information associated with a single network protocol of one of said plurality of network protocols on a first channel, and (ii) said priority information associated with the same single network protocol on a second, alternate channel, said priority information being processed separately from said print job information; and (c) a transmitter circuit that is in communication with said printer and with said plurality of network protocol processing circuits, said transmitter circuit being configured to transmit to said printer (i) said print job information associated with said single network protocol of one of said plurality of network protocols, and (ii) said priority information associated with the same single network protocol, said priority information being transmitted substantially in real time to said printer regardless of the status of any portion of said print job information being transmitted from any of said plurality of network protocol processing circuits.

9. The interface as recited in claim 8, wherein said transmitter circuit is configured to transmit substantially immediately said priority information associated with the same single network protocol in the form of a message that is interspersed between packets of said print job information associated with the same single network protocol, even though a portion of said print job information may remain to be transmitted to said printer.

10. The interface as recited in claim 8, wherein said transmitter circuit is configured to transmit substantially immediately said priority information associated with the same single network protocol in the form of a message that is interspersed between packets of said print job information associated with a different one of said plurality of network protocols, even though a portion of said print job information may remain to be transmitted to said printer.

11. The interface as recited in claim 8, wherein said plurality of network protocols comprise at least two of LexLink, Novell NetWare, Apple Talk, and TCP/IP.

12. The interface as recited in claim 8, wherein each said network protocol processing circuit is further configured to process both (i) print job information having a header containing a first address and in accordance with said first address, and (ii) priority information having a header containing a second address and in accordance with said second address.

13. The interface as recited in claim 8, wherein said print job information corresponds to a first network protocol and includes a first type of header, and said priority information corresponds to said first network protocol and includes a second type of header, and wherein one of said plurality of network protocol processing circuits is configured to process said first network protocol and to distinguish said print job information with said first type of header from said priority information with said second type of header.

14. The interface as recited in claim 9, wherein said receiver circuit is further configured to receive both said print job information and said priority information associated with the same single network protocol; and one of said plurality of network protocol processing circuits is configured to process said priority information via said second, alternate channel substantially simultaneously while processing said print job information via said first channel, thereby bypassing the print job information without said printer having to first complete a pending print job.

15. The interface as recited in claim 14, wherein said receiver circuit is further configured to receive both said print job information associated with a different one of said plurality of network protocols, and said priority information associated with the same single network protocol; and one of said plurality of network protocol processing circuits is configured to process said priority information via said second, alternate channel substantially simultaneously while processing said print job information via said first channel, thereby bypassing the print job information without said printer having to first complete a pending print job.

16. An interface used in a printing system including a multi-protocol network of host computers and a printer, said interface comprising:

(a) a receiver circuit that is in communication with said multi-protocol network of host computers, said network of host computers being configured to transmit both print job information and priority information in a plurality of network protocols, said receiver circuit being configured to receive said print job information in a single network protocol and said priority information in the same said single network protocol;

(b) at least one network protocol processing circuit configured to process said print job information associated with said single network protocol on a first channel, and configured to process priority information associated with said single network protocol on a second, alternate channel; said priority information being processed substantially simultaneously via said second, alternate channel while said print job information is being processed via said first channel, said priority information thereby bypassing the print job information without said printer having to first complete a pending print job; and (c) a transmitter circuit that is in communication with said printer and with said at least one network protocol processing circuit, said transmitter circuit being configured to transmit to said printer both (i) said print job information associated with said single network protocol, and (ii) said priority information associated with said single network protocol, said priority information being transmitted substantially in real time to said printer regardless of the status of any portion of said print job information.

17. The interface as recited in claim 16, wherein said transmitter circuit is configured to transmit substantially immediately said priority information associated with the same single network protocol in the form of a message that is interspersed between packets of said print job information associated with the same single network protocol, even though a portion of said print job information may remain to be transmitted to said printer.

18. An interface used in a printing system including a multi-protocol network of host computers and a printer, said interface comprising:

(a) a receiver circuit that is in communication with said multi-protocol network of host computers, said network of host computers being configured to transmit both print job information and priority information in a plurality of network protocols, said receiver circuit being configured to receive said print job information in a first network protocol and said priority information in a second network protocol;

(b) a plurality of network protocol processing circuits, comprising a first network protocol processing circuit configured to process said print job information associated with said first network protocol on a first channel, and a second network protocol processing circuit configured to process said priority information associated with said second network protocol on a second, alternate channel; said second network protocol processing circuit being further configured to process said priority information substantially simultaneously via said second, alternate channel while said first network protocol processing circuit is further configured to process said print job information via said first channel, said priority information thereby bypassing the print job information without said printer having to first complete a pending print job; and (c) a transmitter circuit that is in communication with said printer and with said plurality of network protocol processing circuits, said transmitter circuit being configured to transmit to said printer both (i) said print job information associated with said first network protocol, and (ii) said priority information associated with said second network protocol, said priority information being transmitted substantially in real time to said printer regardless of the status of any portion of said print job information.

19. The interface as recited in claim 18, wherein said transmitter circuit is configured to transmit substantially immediately said priority information associated with said second network protocol in the form of a message that is interspersed between packets of said print job information associated with said first network protocol, even though a portion of said print job information may remain to be transmitted to said printer.

* * * * *